United States Patent [19]

Acharya et al.

[11] Patent Number: 6,151,415
[45] Date of Patent: Nov. 21, 2000

[54] AUTO-FOCUSING ALGORITHM USING DISCRETE WAVELET TRANSFORM

[75] Inventors: Tinku Acharya, Tempe; Werner Metz, Chandler, both of Ariz.

[73] Assignee: Intel Corporation, Santa Clara, Calif.

[21] Appl. No.: 09/211,309

[22] Filed: Dec. 14, 1998

[51] Int. Cl.$^7$ ................................................. H04N 5/232
[52] U.S. Cl. ............................................ 382/255; 348/345
[58] Field of Search .................................. 382/255, 169, 382/248–250; 348/345, 346–349

[56] References Cited

U.S. PATENT DOCUMENTS

| | | | |
|---|---|---|---|
| 5,200,828 | 4/1993 | Jang et al. | 358/227 |
| 5,512,951 | 4/1996 | Torii | 348/353 |
| 5,885,841 | 3/1999 | Higgs, Jr. et al. | 436/89 |

OTHER PUBLICATIONS

International Search Report, PCT/US99/26664, mailed Feb. 7, 00, 4 pages.

*Primary Examiner*—Thomas D. Lee
*Assistant Examiner*—Stephen Brinich
*Attorney, Agent, or Firm*—Blakely, Sokoloff, Taylor & Zafman LLP

[57] ABSTRACT

What is disclosed is a method that includes generating an overall sharpness parameter for a given focus position by performing a Discrete Wavelet Transform upon an image captured by an imaging device and automatically focusing said imaging device to an optimal focus position by comparing a plurality of different sharpness parameters. The optimal focusing position is automatically determined by finding the highest sharpness parameter for a given scene.

20 Claims, 4 Drawing Sheets

AUTO-FOCUSING ALGORITHM USING DISCRETE WAVELET TRANSFORM

BACKGROUND OF THE INVENTION

1. Field of the Invention

The invention is related to digital imaging. More specifically, the invention relates to architectures and methods for the automatic focusing of digital imaging devices.

2. Description of Related Art

An imaging device such as a digital camera consists of, among others, a lensing sub-system and an image processing sub-system. The lensing system focuses upon an external scene and allows light (illuminant) therefrom in a specified bounded area to strike a sensor array. The sensor array consists of photo-cells which when struck by the illuminant within a particular absorption period will accumulate charge. This charge is then converted into a digital value (pixel value). These captured pixels are then subjected to image processing techniques such as compression, scaling image enhancement, etc. Processed images that are stored in a memory device can then be downloaded into a camera or removed (in the case of a removable memory such as a FLASH card being employed in the camera) for use.

The focusing of the lens system within the camera can have an impact upon the fuzziness or sharpness of the scene as represented by the pixels of the sensor array. Focusing may be cone manually, but is often done automatically. One such automatic focusing technique relies upon FIR (Finite Impulse Response) filters to determine where edge features lie and with what certainty edges can be determined. In images that have high entropy, i.e., pixels of widely varying intensity/color values, such as technique is less effective since averaging yields distorted results. Thus, a focusing technique is needed that can better determine the sharpness of the image regardless of its entropy.

Furthermore, with regard to implementation, if focusing is to be implemented in hardware such as a CMOS (Complementary Metal-Oxide Semiconductor) imaging device, it is important to reduce the computational complexity of the focusing procedure, especially when many other functions must also be carried out by the device. With devices that are dual-moded, which may provide both motion and still imaging, there is also desired methods and apparatus that can readily provide different levels of focusing.

In a device such as a digital camera, whether still or motion video, automatic focusing should be able to be performed in integrated circuits with a minimum of cost and area. Ideally, the focusing method would be able to utilize components used elsewhere in the imaging device for other purposes without building special circuitry for automatic focusing itself.

SUMMARY

What is disclosed is a method that includes generating an overall sharpness parameter for a given focus position by performing a Discrete Wavelet Transform upon an image captured by an imaging device and automatically focusing said imaging device to an optimal focus position by comparing a plurality of different sharpness parameters.

DETAILED DESCRIPTION OF THE INVENTION

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

Using traditional Fourier analysis or transforms, any signal can be approximated as a sum of sinusoidal waveforms of assorted frequencies. While Fourier transforms are ideally suited for signals having repeated behavior, they fail to efficiently approximate signals with sharp discontinuities such as the edge features in images, or signals encoded for digital communications. Thus, Fourier analysis is unsuited where edge features need to be detected in order to determine sharpness since the Fourier transform does not, in the first place, represent edge features adequately. Another form of signal analysis, known as Wavelet analysis has been developed to better represent signals that have exaggerated and discontinuous features. The wavelet itself is a discontinuous and jagged curve when rendered, and by combining several wavelets, a much improved representation of image features is available. Another transform known as the Discrete Wavelet Transform (DWT), based on Wavelet analysis, has been developed to better represent discontinuities such as in the edge features of digital images.

A fundamental difference between Fourier transforms and Wavelet transforms is that Wavelet transforms are localized in space as well as time. Thus, both space (time-domain) and frequency are preserved when a signal is decomposed by Wavelet analysis. Since the Fourier transform is periodic in nature, it does not well represent spatial discontinuities, whereas as the Wavelet transform is by nature discontinuous and has localized variations that disappear or do not exist in all locations of the signal. General Wavelet theory is quite known in the art of signal analysis and will not be described so as not to obscure the invention.

The DWT is a "discrete" algorithm, and thus approximates the input signal by discrete samples of a full wavelet. Thus, with these discrete sample points, the DWT can be thought of as also being a filter with well-defined coefficients. The DWT chosen in at least one embodiment of the invention for image scaling is the 9-7 bi-orthogonal spline DWT. Since the DWT is discrete, the DWT can be implemented using digital logic such as Very Large Scale Integration (VLSI) circuits and thus can be integrated on a chip with other digital components. Thus, the EWT can easily be implemented in an imaging device such as a digital still or video camera. The ability of the DWT to better approximate the features of an image make it ideal for image compression and have been so employed in the field of imaging. In a device that uses a DWT for image compression, an auto-focusing technique can be efficiently implemented within the device since the DWT computing engine is already incorporated therein for the purpose of image compression.

Figure 1:
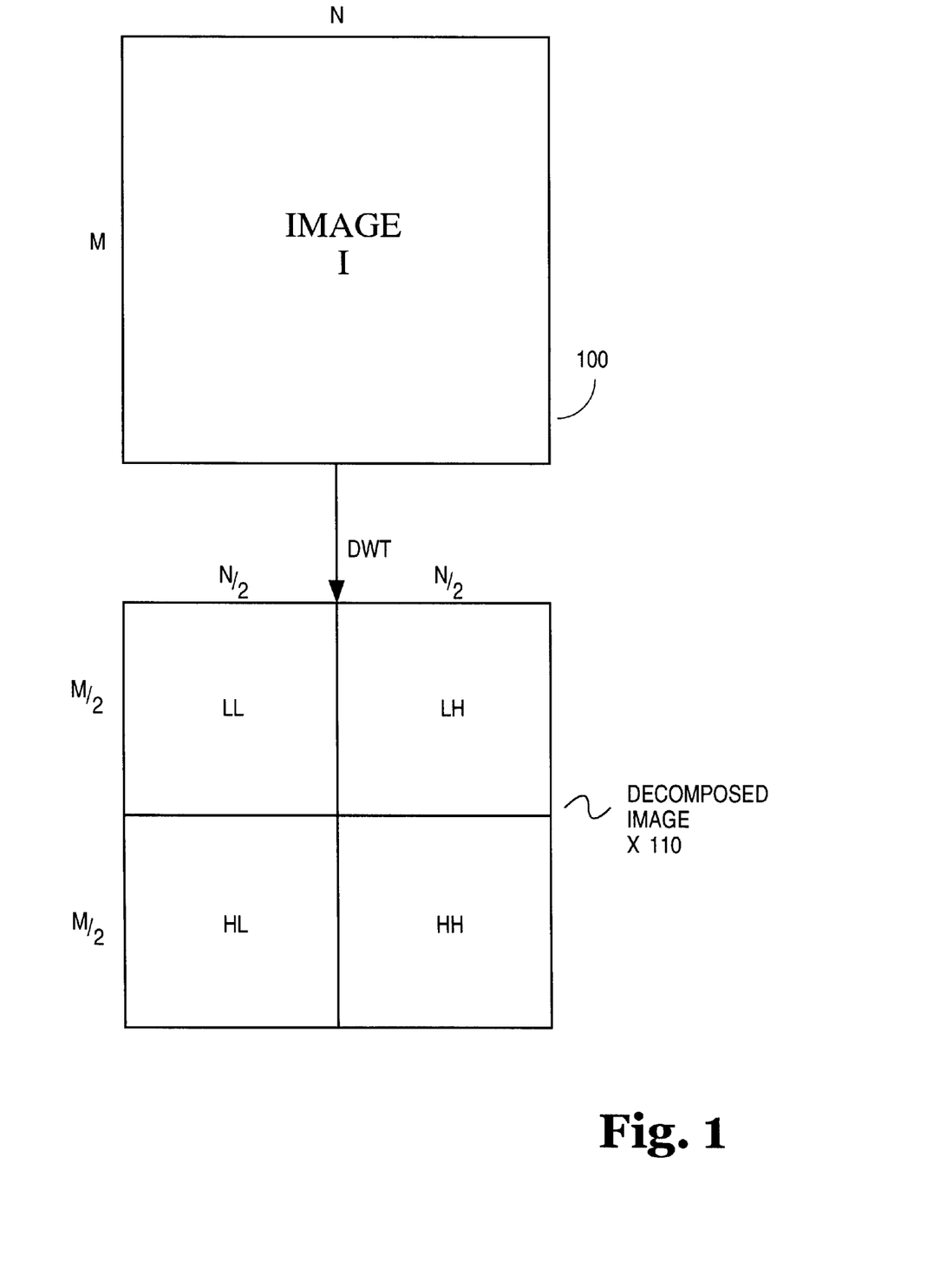
FIG. 1 illustrates the decomposition of an image using a Discrete Wavelet Transform.

FIG. 1 illustrates the decomposition of an image using a Discrete Wavelet Transform.

The decomposition of an input image I 100 by means of a DWT is illustrated in FIG. 1. The illustrated decomposition utilizes a DWT in two dimensions, that is, a DWT applied row-wise and then column-wise. The result is a decomposed image X 110 which has four "sub-bands" designated LL, LH, HL and HH.

If an image 100 has a dimension M*N (M rows and N columns of pixels), then the application of two-dimensional DWT will create four sub-bands each with dimensions of M/2*N/2. The LL sub-band contains most of the original image information and is essentially a one-half scale version of the original input image I 100. The HL sub-band contains extracted edges from the input image I 100, namely, those edges which lie in a vertical direction. Likewise, the LH sub-band contains extracted edges from the input image I 100, namely, those that lie in the horizontal direction. The HH sub-band contains high-frequency noise and those edges of the input image I 100 that are not horizontal or vertical in orientation.

In one embodiment of the invention, the edge extracting properties of DWT generated sub-bands are used to determine the adequacy of a particular focusing position. A "sharpness" parameter is thus defined with regard to one or more of these sub-bands. The sharpness parameter attempts to measure the prominence of edges within the DWT sub-bands. Edges within an image define outlines of objects or boundaries between regions. Edges are definable as a change in the grayscale intensity between one pixel and its neighbor(s). The DWT sub-bands are sensitive to and highlight this change in intensity level and thus can operate as edge discriminators. Since change in intensity can be often occurring, changes can be compared to a threshold to determine which changes constitute an edge and what changes do not.

In using the DWT sub-bands for this purpose, not all sub-bands need to be utilized. Since the LL sub-band is just a scaled down version of the original image, it is as computationally intense to determine edges therein as would such edge determination if performed on the input image. Thus, the LL sub-band can be disregarded in the sharpness parameter evaluation. Likewise, the HH sub-band can be disregarded since it statistically contains more noise than useful edge information, especially in input images that are initially noisy. Hence, in one embodiment of the invention, only the LH and HL sub-bands are used in the determination of edges and thus the evaluation of the sharpness of the image. In general, the sharper the image, the more likely the lens system which captured the image is of optimal focus.

Figure 2:
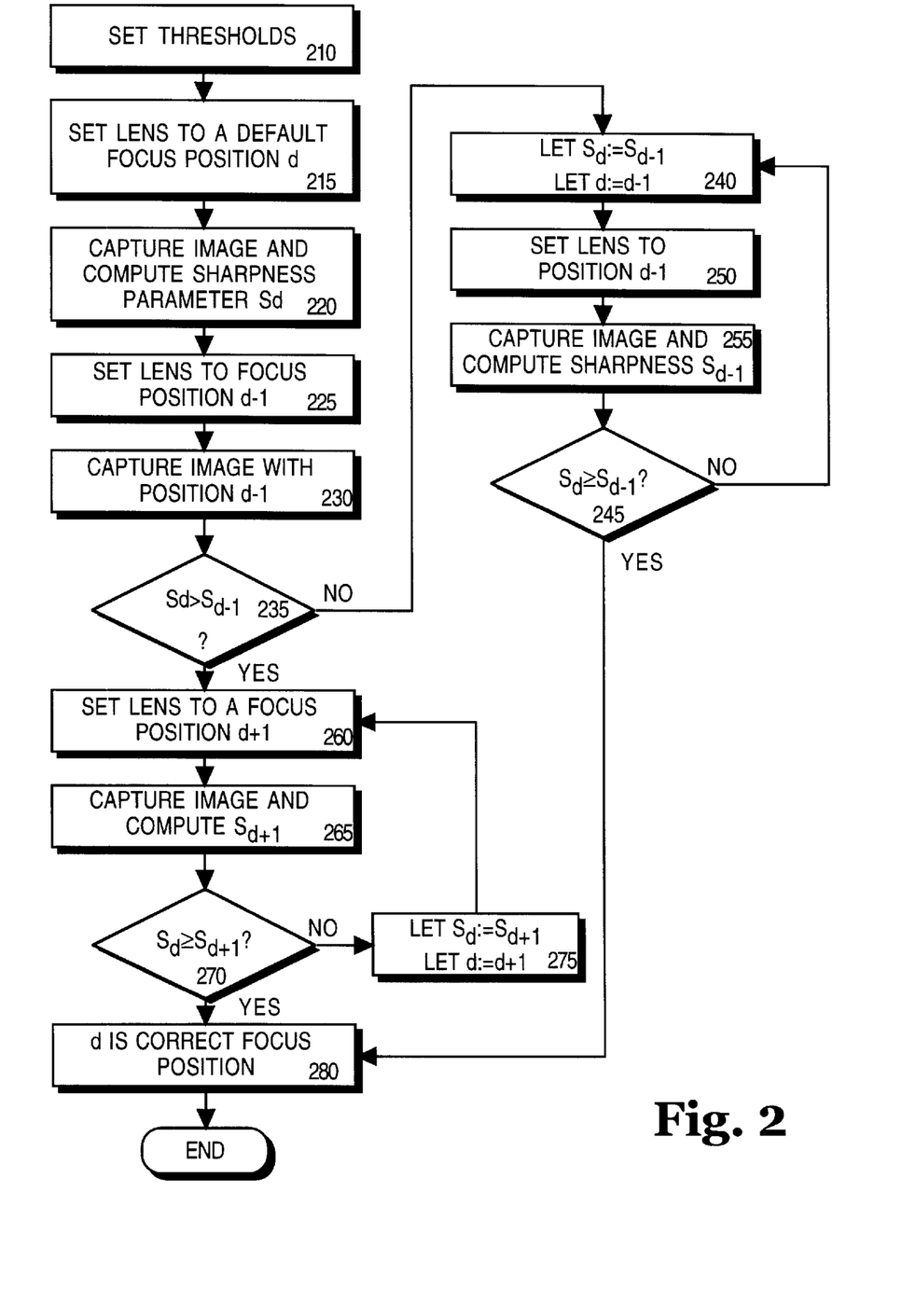
FIG. 2 is a flow diagram of one embodiment of the invention.

FIG. 2 is a flow diagram of one embodiment of the invention.

The methodology for discrete wavelet transform (DWT) based auto-focusing of an imaging device involves application of the DWT upon a series of captured images (each captured at a different focus length), computing at each captured image its sharpness parameter. The focus position used to capture that image that has the highest sharpness parameter is the most optimal focus position.

The first step is to select or set certain threshold values against which the content of the sub-bands can be compared (step 210). This eliminates spurious information in the sub-band such as a false edge. The thresholds may be based on the content of the sub-band, specifically, upon the minimum and maximum of the absolute values of the DWT coefficient, $x_{min}$ and $x_{max}$, respectively, within the sub-band. For instance, a lower threshold $T_L$, below which values will not be considered for edge determination, may be defined that is equal to $k_L * x_{min}$, where $k_L$ is a device dependent constant lying between 1.0 and 1.5, inclusive. Likewise, an upper threshold $T_H$, above which values will not be considered for edge determination, may be defined that is equal to $k_H * x_{max}$, where $k_H$ is a device dependent constant lying between 0.5 and 1.0, inclusive. The sharpness parameter S for a given sub-band is the average of the absolute values of the DWT coefficients within that sub-band that fall between $T_L$ and $T_H$, inclusive. For the entire image at a particular focus position d, the overall sharpness parameter $S_d$ at that position is the average of the sharpness parameters for the LH and HL DWT sub-bands.

With this thresholding in place, the optimal focus position for a given scene may be automatically obtained by the following procedure. For purposes of this discussion, assume that the mechanical device in the lens system can position itself in some finite number (N) of discrete focus positions $D_0, D_1, \ldots D_{N-1}$. The lens system is first set to a default focus position "d" (step 215). Using this focus position d, an image then captured and after performing a DWT upon it, its sharpness parameter $S_d$ is computed (step 220). Since the quality of focusing can be best measured by comparison, another focus position is next chosen. For instance, the lens system can be set to the immediately previous focus position d−1 (step 225). In referring to "d−1," intended meaning is that if the present focus position d=$D_i$, then d−1=$D_{i-1}$. Again, an image of substantially the same scene as that captured in step 220 is captured and the sharpness parameter $S_{d-1}$ is computed (step 230).

The two focus position sharpness parameters, $S_d$ and $S_{d-1}$, are then compared (step 235) to determine in which direction the next evaluation should be made (successive or preceding focus position). Generally speaking, a minimum of three focus positions should be tested before a proper conclusion can be made regarding the optimal focus position for the scene. If $S_d$ is greater $S_{d-1}$ (checked at step 235), then the next higher focus position, d+1, for instance, is chosen for comparison since it is then known that preceding focus positions d−1, d−2, etc., yield lower sharpness parameters, and thus are more out of focus. In this case, the lens system is set to the next higher focus position d+1 (step 260) D+1 which indicates the discrete position $D_{i+1}$, if d=$D_i$. Then, an image is captured of substantially the same scene as that of step 230, and its sharpness parameter $S_{d+1}$ is computed (step 265). Since focus position d−1 was eliminated by the comparison to focus position d (at step 235), d and d+1 are now compared using their respective sharpness parameters $S_d$ and $S_{d+1}$. If $S_d$ is greater than or equal to $S_{d+1}$, then d is the most optimal focus position (step 280), since all other focus positions d+1, d+2 etc. will have decreasing sharpness. Thus, in general, a focus position d will be the most optimal focus position when $S_d >= S_{d-1}$ and $S_d >= S_{d+1}$. If $S_d$ is less than $S_{d+1}$, then focus position d+1 or some higher focus position is potentially the optimal focus position. Thus, the default focus position, d, is set to become equal to d+1, and likewise, the sharpness parameter $S_d$ is set equal to $S_{d+1}$ (step 275). For instance if d was previously equal to $D_9$, then it is set to d+1 or $D_{10}$. After this resetting of the default focus position d to d+1, steps 260, 265 and 270 are repeated. Once $S_d >= S_{d+1}$, the auto-focusing procedure can be terminated and d can be selected as the appropriate or optimal focus position. A numerical example and table are given below with reference to FIG. 3.

Reverting back to step 235, if $S_d$ was not greater than $S_{d-1}$, then d+1 and higher focus positions could not be the most optimal, but rather d−1 or perhaps lower focus positions such as d−2, d−3, etc. Since the original default focus position d (from step 215) has been eliminated from consideration by virtue of this comparison, the default focus position d is reset to d−1 (step 240). Likewise, the sharpness parameter $S_d$ is set equal to $S_{d-1}$ (step 240). For instance if d were $D_9$, then d is set equal to $D_8$. With the default focus position thus reset to the next lower value, the sharpness of the captured image at lower focus positions must be tested. Accordingly, the lens system is set to a focus position d−1 (step 250). The, an image is captured at focus position d−1 and $S_{d-1}$ is computed. If $S_d$ is greater than or equal to $S_{d-1}$ then d can be selected as the appropriate or optimal focus position (step 280), the procedure of auto-focusing thus completed. If $S_d$ is not greater than or equal to $S_{d-1}$, then even lower focus positions need to be tested and thus the steps of resetting the default focus position d to d−1 and comparing new focus position sharpness parameters against previously evaluated ones (i.e., steps 240 through 255) are repeatedly applied until $S_d >= S_{d-1}$ at which point the current d can be selected as the appropriate or optimal focus position.

Figure 3:
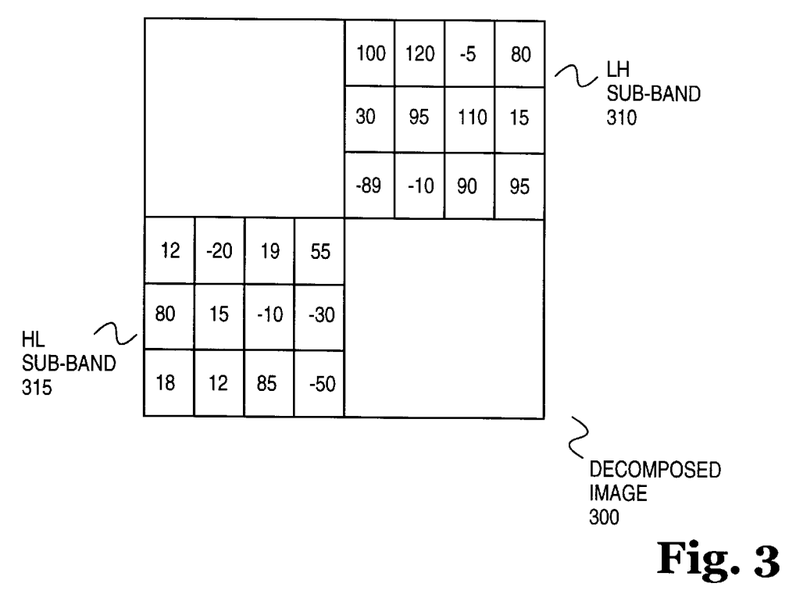
FIG. 3 is an example of the sharpness parameter computation as embodied in the invention.

FIG. 3 is an example of the sharpness parameter computation as embodied in the invention.

FIG. 3 shows a decomposed image 300 that results from subjecting some input image to a two-dimensional DWT. Four sub-bands, namely an LL, LH, HL and HH, make up the decomposed image 300. As discussed above, the LL and HH sub-bands may be excluded from the sharpness determination, leaving LH sub-band 310 and HL sub-band 315 for this determination. The sharpness parameter for the whole image is defined as the average of the sharpness parameter for the HL sub-band and the sharpness parameter for the LH sub-band. Each of the sub-bands LH 310 and HL 315 have sixteen values (which for simplicity have been represented as integers, though they may not in an actual DWT sub-band).

Considering first the HL sub-band 315, the thresholding for the sub-band needs to be established. Assuming that the device dependent constants $k_L$ and $k_H$ are 1.1 and 0.9, respectively, the lower threshold $T_L$ is $1.1*x_{min}$ and the upper threshold $T_H$ is $0.9*x_{min}$, where $x_{min}$ and $x_{max}$ are the minimum and maximum DWT coefficients, respectively, within the sub-band. Referring to the sixteen DWT coefficients shown for the HL sub-band 315 $x_{min}$ is $|-50|$ or 50 and $x_{max}$ is 85. Thus, the lower threshold $T_L$ would be 55 (50*1.1) and the upper threshold $T_H$ would be 77 (85*0.9 rounded to the nearest integer). The sharpness parameter for the HL sub-band 315 would take the average of the absolute values of the DWT coefficients $x_i$ that fall in the range $[T_L, T_H]$, or [55, 77], inclusive. Only one value (Coefficient) 55 falls in that range so that the sharpness parameter is simply 55.

Likewise, for sub-band LH 310, assuming the device dependent parameters are the same, the thresholds for that sub-band are $T_L = |-80|*1.1 = 88$, and $T_H = |110|*0.9 = 99$. Thus, the sharpness parameter for the LH sub-band 310 is determined by averaging together those values (coefficients) whose absolute values fall between 88 and 99, inclusive. Four of the coefficients, namely, 90, 95, 95 and −89, satisfy this criteria. Thus, the sharpness parameter for the LH sub-band 310 is the average of the absolute values of these coefficients or 92 (the rounded result of [90+95+95+89]/4).

The sharpness parameter for the entire image is the average of the sharpness parameter for the LH and HL sub-bands or 74 (the rounded result of [55+92]/2). While the above example has been shown for sake of simplicity with integers, any desired precision or number type may be employed and maintained. Additionally, the use of LH ad HL sub-bands that have only sixteen values each in their coefficient data sets is merely exemplary.

Figure 4:
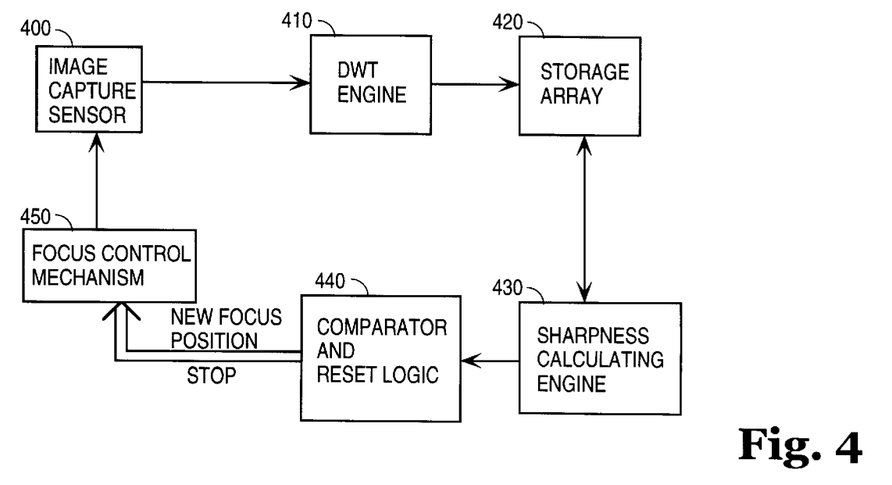
FIG. 4 is a block diagram of at least one embodiment of the invention.

FIG. 4 is a block diagram of at least one embodiment of the invention.

In the block diagram of FIG. 4 an image capture sensor 400 snaps an image of a scene at a particular focus position, initially a default position d. The captured image data is then sent to/accessed by a DWT engine 410, which may be present in the system already for purposes of image compression or scaling. DWT engine 410 should be capable of performing a two-dimensional DWT upon an input image. The DWT result data (coefficients) may then be stored into a storage array 420 for further analysis. The stored data can be accessed by, among others, a sharpness calculating engine 430 which sets thresholds and performs averaging of that part of the DWT data set (particularly, the LH and HL sub-bands) meeting the threshold criterion. The sharpness calculating engine computes the sharpening parameter in a manner similar to that described above and sends the result to a comparator and reset logic 440 which compares the sharpness parameter to another sharpness parameter for a different focus position. Depending upon the result of the comparison, logic 440 either calculates a new focus position for further comparison or asserts a stop signal to terminate the auto-focusing procedure. The new focus position or stop signal are sent to a control mechanism 450 which sets the new focus position or keeps the current focus position as being the optimal or appropriate focus position. Image capture sensor 400 then captures an image at the focus position dictated by the focus control mechanism 450.

Figure 5:
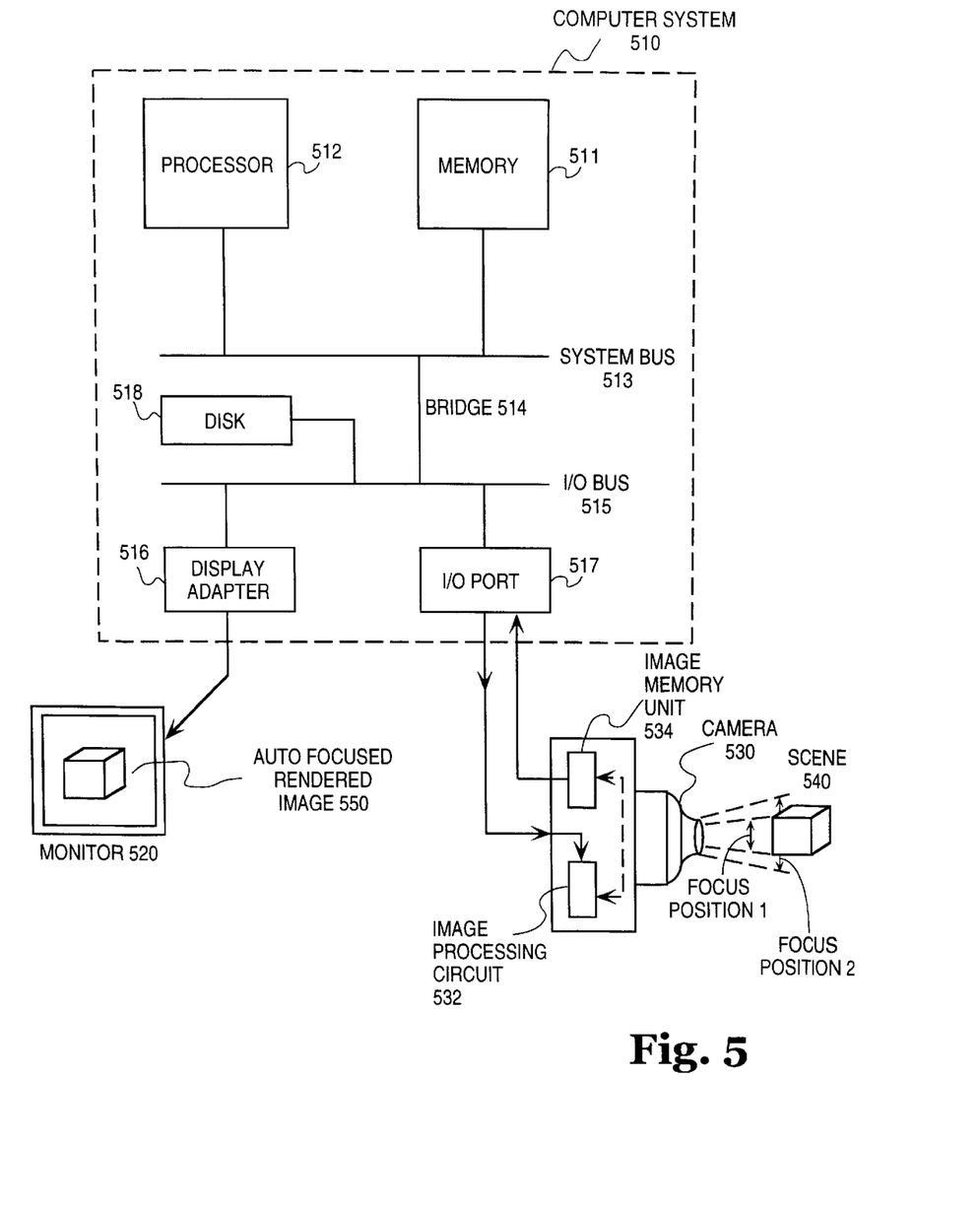
FIG. 5 is a system diagram of one embodiment of the invention.

FIG. 5 is a system diagram of one embodiment of the invention.

Illustrated is a computer system 510, which may be any general or special purpose computing or data processing machine such as a PC (personal computer), coupled to a camera 530. Camera 530 may be a digital camera, digital video camera, or any image capture device or imaging system, or combination thereof that has a focusing mechanism and may be utilized to capture an image of a scene 540. Essentially, captured images are processed by an image processing circuit 532 so that they can be efficiently stored in an image memory unit 534, which may be a ROM, RAM or other storage device such as a fixed disk. The image contained within image memory unit 534 that is destined for computer system 510 is the result of auto-focusing within the camera 530 and thus is optimized with regard to focus. In most digital cameras that can perform still imaging, images are stored first and downloaded later. This allows the camera 530 to capture the next object/scene quickly without additional delay. However, in the case of digital video camera, especially one used for live videoconferencing, it is important that images not only be quickly captured, but quickly processed and transmitted out of camera 530. The auto-focusing scheme of the invention in various embodiments is well-suited to providing fast throughput to other parts of the image processing circuit 532 so that the overall speed of transmitting image frames is not adversely impacted.

According to one embodiment of the invention, auto-focusing is aided by components such as a DWT engine that may be part of the image processing circuit 532. The camera 530 may capture images of scene 540 at two or more focus positions, each yielding a slightly different quality in terms of sharpness. By measuring the sharpness of the image at various focus positions in an efficient manner, the appropriate or optimal focus position for the camera 530 may be ascertained. After the camera is auto-focused and an image captured at that focus position, the captured image may also be compressed for transport. The rendering of the auto-focused image may be achieved using a processor 512 such as the Pentium® processor (a product of Intel Corporation) and a memory 511, such as RAM, which is used to store/load instruction addresses and result data. In an alternative embodiment, auto-focusing may be achieved in conjunction with software executed on computer system 510 rather than directly in hardware. The instructions for such software may be stored to a disk 518 or memory 511. It would be readily apparent to one of ordinary skill in the art to program a computing machine to auto-focus a camera given that the methodology described in the various embodiments of the invention are utilized.

Computer system 510 has a system bus 513 which facilitates information transfer to/from the processor 512 and memory 511 and a bridge 514 which couples to an I/O bus 515. I/O bus 515 connects various I/O devices such as a display adapter 516, disk 518 and an I/O port 517, such as a serial port. Many such combinations of I/O devices, buses and bridges can be utilized with the invention and the combination shown is merely illustrative of one such possible combination.

When an image, such as an image of a scene 540, is to be captured by camera 530, it may be necessary to first auto-focus camera 530. Image processing circuit 532 consists of ICs and other components which may execute, among other functions, the DWT of captured images, which may be utilized in an auto-focusing procedure. The auto-focusing operation, as described earlier, may utilize image memory unit 534 to store the DWT result data for analysis.

The auto-focused and then compressed images are decompressed on computer system 510 by suitable application software (or hardware), which may utilize processor 512 for its execution. The image data may then be rendered visually using a display adapter 516 into a rendered image 550. In a videoconferencing application, the image data in its compressed form may be communicated over a network or communication system to another node or computer system in addition to or exclusive of computer system 510 so that a videoconferencing session may take place. Whatever the intended application or use, the end result will be a higher quality rendered image 550 that displayed onto monitor 520 or other nodes in a videoconferencing session as compared with manual or other prior art auto-focusing methods.

In the foregoing specification, the invention has been described with reference to specific exemplary embodiments thereof. It will however be evident that various modifications and changes may be made thereto without departing from the broader spirit and scope of the invention as set forth in the appended claims. The specification and drawings are accordingly to be regarded as illustrative rather than restrictive.

What is claimed is:

1. A method comprising:
    generating a plurality of different overall sharpness parameters each corresponding to a different focus position by performing a Discrete Wavelet Transform upon a plurality of different images each corresponding to a different focus position captured by an imaging device; and
    automatically focusing said imaging device to an optimal focus position by comparing said plurality of different overall sharpness parameters.

2. A method according to claim 1 wherein said generating comprises:
    performing a Discrete Wavelet Transform (DWT) upon said captured image, said DWT creating four sub-bands designated as LL, LH, HL and HH in accordance with their DWT frequency correlation; and
    averaging sub-band specific sharpness parameters for said LH and HL sub-bands, said average constituting said overall sharpness parameter.

3. A method according to claim 2 wherein said averaging includes:
    generating an LH sub-band specific sharpness parameter; and
    generating an HL sub-band specific sharpness parameter.

4. A method according to claim 3 wherein generating an LH sub-band specific sharpness parameter includes:
    determining an upper and lower threshold for said LH sub-band; and
    averaging together DWT coefficients within said LH sub-band whose absolute values inclusively fall between said lower and upper thresholds, said average constituting said LH sub-band specific sharpness parameter.

5. A method according to claim 3 wherein generating an HL sub-band specific sharpness parameter includes:
    determining an upper and lower threshold for said HL sub-band; and
    averaging together DWT coefficients within the HL sub-band whose absolute values inclusively fall between said lower and upper thresholds, said average constituting said HL sub-band specific sharpness parameter.

6. A method according to claim 2 wherein said DWT includes the bi-orthogonal splines DWT.

7. A method according to claim 1 wherein said imaging device includes a digital camera.

8. A method according to claim 1 wherein said automatically focusing includes:
    setting a first focus position as the default focus position for the lensing system of said imaging device;
    capturing an image at said first focus position; and
    computing a first sharpness parameter to be the default sharpness parameter from said captured image.

9. A method according to claim 8 including:
    setting a second focus position lower than said first focus position;
    capturing an image at said second focus position;
    computing a second sharpness parameter from said captured image;
    if said second sharpness parameter is greater than said default sharpness parameter, then resetting said default focus position to a second focus position and resetting said default sharpness parameter to said second sharpness parameter wherein said steps of setting, capturing, computing and resetting repeat until said second sharpness parameter is less than or equal to said default focus position, said default focus position thereupon being selected as said optimal focus position.

10. A method according to claim 9 wherein if said second sharpness parameter is less than said first sharpness parameter then:
    setting a third focus position higher than said default focus position;
    capturing an image at said third focus position;
    computing a third sharpness parameter from said captured image;

if said third sharpness parameter is greater than said default sharpness parameter, then resetting said default focus position to said third focus position and resetting said default sharpness parameter to said third sharpness parameter wherein said steps of setting, capturing, computing and resetting repeat until said third sharpness parameter is less than or equal to said default focus position, said default focus position thereupon being selected as said optimal focus position.

11. A method according to claim 1 wherein said generating comprises:

performing a Discrete Wavelet Transform (DWT) upon said captured image, said DWT creating sub-bands in accordance with their DWT frequency correlation;

generating sub-band specific sharpness parameters for at least one of said sub-bands;

averaging said sub-band specific sharpness parameters, said average constituting said overall sharpness parameter.

12. A method according to claim 11 wherein said generating comprises:

determining an upper and lower threshold for at least one of said sub-bands;

averaging together DWT coefficients within said at least one sub-band whose absolute values inclusively fall between said lower and upper thresholds, said average constituting said sub-band specific sharpness parameter.

13. An apparatus comprising:

an image capture sensor;

a DWT (Discrete Wavelet Transform) engine coupled to said image capture sensor, said DWT engine adapted to perform a DWT upon images captured by said sensor; and a focus control mechanism coupled to said image capture sensor and said DWT engine, said focus control mechanism adapted to automatically set an optimal focus position for said image capture sensor based on said DWT.

14. An apparatus according to claim 13 comprising:

a sharpness calculating engine coupled to said DWT engine, said sharpness calculating engine adapted to provide a sharpness parameter for captured images based upon averaging selected sub-sets of DWT result data.

15. An apparatus according to claim 14 comprising:

comparator and reset logic coupled to said sharpness calculating engine and to said focus control mechanism, said logic terminating said automatic setting of an optimal focus position when an optimal focus is determinable from said sharpness parameters generated by said sharpness calculating engine, said logic adapted to provide a new focus position to said focus control mechanism in order to compare a default sharpness parameter with a new sharpness parameter.

16. An apparatus according to claim 14 comprising a storage mechanism coupled to said DWT engine and said sharpness calculating engine, said storage mechanism adapted to store DWT result data for access by said sharpness calculating engine.

17. An apparatus according to claim 14 wherein said sharpness calculating engine is adapted to perform said averaging of selected sub-sets of DWT result data by determining an upper and lower threshold for at least one of said sub-sets of DWT result data and averaging together DWT coefficients within said at least one sub-set of DWT result data whose absolute values inclusively fall between said lower and upper thresholds.

18. An article comprising a computer readable medium having instructions stored thereon which when executed causes:

generating an overall sharpness parameter for a given focus position by performing a Discrete Wavelet Transform upon an image captured by an imaging device; and automatically focusing said imaging device to an optimal focus position by comparing a plurality of different overall sharpness parameters.

19. An article according to claim 18 wherein said Discrete Wavelet Transform (DWT) performed upon said captured image creates sub-bands in accordance with their DWT frequency correlation and wherein said plurality of different overall sharpness parameters are created by generating sub-band specific sharpness parameters for at least one of said sub-bands and averaging said sub-band specific sharpness parameters, said average constituting one of said plurality of different overall sharpness parameters.

20. An article according to claim 19 wherein said sub-band specific sharpness parameters are created by determining an upper and lower threshold for at least one of said sub-bands, and averaging together DWT coefficients within said at least one sub-band whose absolute values inclusively fall between said lower and upper thresholds, said average constituting said sub-band specific sharpness parameter.

* * * * *

UNITED STATES PATENT AND TRADEMARK OFFICE
CERTIFICATE OF CORRECTION

PATENT NO. : 6,151,415
DATED : November 21, 2000
INVENTOR(S) : Acharya et al.

It is certified that error appears in the above-identified patent and that said Letters Patent is hereby corrected as shown below:

Column 1,
Line 28, delete "cone" and insert -- done --.

Column 2,
Line 57, delete "EWT" and insert -- DWT --.

Signed and Sealed this

Tenth Day of September, 2002

*Attest:*

*Attesting Officer*

JAMES E. ROGAN
*Director of the United States Patent and Trademark Office*